US009660397B2

(12) United States Patent
Islam et al.

(10) Patent No.: US 9,660,397 B2
(45) Date of Patent: May 23, 2017

(54) PLATE FOR CABLE CONNECTOR ATTACHMENTS (71) Applicant: CommScope Technologies LLC, Hickory, NC (US)

(72) Inventors: Nahid Islam, Westmont, IL (US); John T. Hanley, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/667,578

(22) Filed: Mar. 24, 2015

(65) Prior Publication Data
US 2015/0270637 A1 Sep. 24, 2015

Related U.S. Application Data (60) Provisional application No. 61/969,529, filed on Mar. 24, 2014.

(51) Int. Cl.
*H01R 13/66* (2006.01)
*H01R 13/74* (2006.01)
(Continued)

(52) U.S. Cl.
CPC ............ *H01R 13/74* (2013.01); *H01R 13/518* (2013.01); *H01R 13/64* (2013.01); *H01R 13/746* (2013.01)

(58) Field of Classification Search
CPC ............................ H01R 13/74; H01R 13/518
(Continued)

(56) References Cited

U.S. PATENT DOCUMENTS 4,415,188 A * 11/1983 Ginter, Jr. ........... F01N 13/1805
24/277
4,424,412 A 1/1984 Goetter
(Continued)

FOREIGN PATENT DOCUMENTS

JP         05217629 A * 8/1993
KR  10-2007-0005119     1/2007
(Continued)

*Primary Examiner* — Tulsidas C Patel
*Assistant Examiner* — Peter G Leigh
(74) *Attorney, Agent, or Firm* — Myers Bigel, P.A.

(57) ABSTRACT

A mounting system for facilitating ordered mating of plural connectors includes a bracket having at least one feature for securing to a pole or wall. A plate is connected to the bracket and includes plural mounting positions. Optional grounding and/or surge arrestors may be included. In a keying embodiment, each mounting position has an inner perimeter shape different than the inner perimeter shapes of the other mounting positions. Each connector of plural first connectors includes a threaded portion holding a first nut with an outer perimeter having a shape unique as compared to the first nuts of other first connectors. The outer perimeter of the first nut seats into one, and only one, of the plural mounting positions of the plate. Optionally, a second plate may be mounted to and spaced from the first plate. The second plate includes plural keyholes which are aligned to the plural mounting positions. Each keyhole has an inner perimeter shape matching the inner perimeter shape of the mounting position to which the keyhole is aligned. The keyholes only permit a second connector, with a matching key nut, to pass therethrough and mate into the first connector in the aligned mounting position.

18 Claims, 10 Drawing Sheets

(51) Int. Cl.
  *H01R 13/64* (2006.01)
  *H01R 13/518* (2006.01)
(58) Field of Classification Search
  USPC ....... 439/540.1, 551, 535, 564; 174/58, 480, 174/481; 385/134, 135
  See application file for complete search history.

(56) References Cited

U.S. PATENT DOCUMENTS

| | | | |
|---|---|---|---|
| 4,558,174 A | 12/1985 | Massey | |
| 4,998,691 A * | 3/1991 | Brown | F16L 3/1016 248/68.1 |
| 5,092,792 A | 3/1992 | Nilsson | |
| 5,245,133 A | 9/1993 | DeCarlo | |
| 5,251,373 A | 10/1993 | DeCarlo | |
| 5,446,823 A | 8/1995 | Bingham | |
| 5,615,850 A * | 4/1997 | Cloninger | F16L 3/22 211/26 |
| 5,631,993 A | 5/1997 | Cloud | |
| 5,658,166 A * | 8/1997 | Freeman | H01R 13/518 439/49 |
| 5,765,698 A * | 6/1998 | Bullivant | H01R 9/2416 211/26 |
| 5,793,921 A | 8/1998 | Wilkins | |
| 6,051,792 A | 4/2000 | Damm | |
| 6,231,051 B1 | 5/2001 | Mueller | |
| 6,242,700 B1 | 6/2001 | Smith | |
| 6,343,440 B1 | 2/2002 | Ayers | |
| 6,347,714 B1 * | 2/2002 | Fournier | G02B 6/4452 211/26 |
| 6,721,483 B2 | 4/2004 | Grubish | |
| 6,857,606 B1 * | 2/2005 | Gretz | F16L 3/223 248/68.1 |
| 6,872,891 B2 | 3/2005 | Angele | |
| 6,918,786 B2 * | 7/2005 | Barker | G02B 6/4452 439/540.1 |
| 6,959,821 B2 * | 11/2005 | Huang | G09F 9/35 211/13.1 |
| 6,981,893 B2 * | 1/2006 | Barker | G02B 6/4452 439/540.1 |
| 7,022,916 B1 * | 4/2006 | Cavanaugh | H05K 7/1491 174/100 |
| 7,220,062 B2 * | 5/2007 | Durrant | G02B 6/4246 385/88 |
| 7,241,170 B1 * | 7/2007 | Lindner | H01R 13/74 439/536 |
| 7,258,583 B1 * | 8/2007 | Baiza | H02G 3/0431 174/72 A |
| 7,303,432 B1 * | 12/2007 | Chen | H01R 13/518 439/540.1 |
| 7,316,518 B2 | 1/2008 | Sasaki | |
| 7,344,407 B1 * | 3/2008 | Chen | H01R 13/516 439/540.1 |
| 7,521,634 B2 | 4/2009 | Clem et al. | |
| 7,598,457 B2 * | 10/2009 | Allen | H02G 15/117 174/92 |
| 7,635,273 B2 * | 12/2009 | Buzil | H01R 13/70 439/214 |
| 7,641,514 B2 * | 1/2010 | Chen | H01R 13/518 439/540.1 |
| RE42,970 E * | 11/2011 | Fournier | G02B 6/4452 211/26 |
| 8,353,143 B2 * | 1/2013 | Osborn | F16B 2/065 248/228.1 |
| 8,353,724 B2 * | 1/2013 | Shi | H01R 13/5812 439/540.1 |
| 8,513,543 B1 | 8/2013 | Lin | |
| 8,585,437 B2 * | 11/2013 | Lin | H01R 13/518 439/532 |
| 8,744,228 B2 | 6/2014 | Womack | |
| 8,839,594 B2 | 9/2014 | Smith | |
| 2003/0148794 A1 | 8/2003 | Wilson, Jr. | |
| 2004/0156611 A1 | 8/2004 | Cloud | |
| 2005/0164548 A1 * | 7/2005 | Spears | G06F 1/182 439/540.1 |
| 2006/0172578 A1 * | 8/2006 | Parsons | H01R 13/5202 439/291 |
| 2006/0291792 A1 | 12/2006 | Vo | |
| 2007/0047895 A1 | 3/2007 | Parikh | |
| 2008/0214045 A1 * | 9/2008 | Tu | H01R 25/003 439/540.1 |
| 2009/0046985 A1 * | 2/2009 | Gronvall | G02B 6/4442 385/135 |
| 2009/0074369 A1 * | 3/2009 | Bolton | G02B 6/4441 385/135 |
| 2009/0239413 A1 * | 9/2009 | Milette | H01R 13/518 439/540.1 |
| 2009/0269977 A1 * | 10/2009 | Chen | H01R 13/518 439/540.1 |
| 2010/0181099 A1 | 7/2010 | Kameda et al. | |
| 2010/0290746 A1 * | 11/2010 | Bran de Leon | G02B 6/4446 385/100 |
| 2012/0087628 A1 * | 4/2012 | Bran de Leon | G02B 6/3887 385/136 |
| 2012/0231320 A1 | 9/2012 | Heck et al. | |
| 2013/0014974 A1 | 1/2013 | Burke | |
| 2013/0294738 A1 * | 11/2013 | Simmons | G02B 6/4439 385/135 |
| 2014/0153876 A1 | 6/2014 | Dendas | |
| 2014/0367163 A1 * | 12/2014 | Islam | B65H 75/18 174/70 R |
| 2015/0378122 A1 | 12/2015 | Simmons | |

FOREIGN PATENT DOCUMENTS

| | | | |
|---|---|---|---|
| KR | 10-2007-0005119 A | 1/2007 | |
| WO | WO 2007126459 A3 * | 8/2008 | H01R 13/74 |

* cited by examiner

PLATE FOR CABLE CONNECTOR ATTACHMENTS

This application claims the benefit of U.S. Provisional Application No. 61/969,529, filed Mar. 24, 2014, the entire contents of which are herein incorporated by reference.

BACKGROUND OF THE INVENTION

1. Field of the Invention

The present invention relates to a mount system for facilitating ordered mating of plural connectors. More particularly, the present invention relates to a mounting system used to connect jumper cables to trunk cables in an antenna tower environment.

2. Description of the Related Art

A box unit for connecting jumper cables to trunk cables is known in the prior art of antenna tower wiring systems.

SUMMARY OF THE INVENTION

The Applicant has appreciated a need for a connection structure and mounting system, which is simpler in design and less costly to manufacture. The Applicant has also appreciated a need for a design with an inexpensive keying system to simplify the assembly procedures in the field, making the connection process rather foolproof, such that jumper and trunk cables may only be connected in the proper manner.

One type of connector, which may benefit from the present invention, is the type of mated connectors which exist between the jumper cables (extending up the antenna structure to the remote radio units) and the trunk cables extending down the tower to ground level equipment of the service provider. These connectors may be hybrid connectors (having both fiber and electrical elements). Alternatively, each connector may present only fiber connections or only electrical connections. Specific functions, like an alarm function, may be dedicated to its own keyed or non-keyed connector. Connector structures to achieve these and other objects are taught in the present disclosure.

In accordance with the present invention, a mounting system for facilitating ordered mating of plural connectors includes a bracket having at least one feature for securing to a pole or wall. A plate is connected to the bracket and includes plural mounting positions.

Optional grounding and/or surge arrestors may be included.

In a keying embodiment, each mounting position has an inner perimeter shape different than the inner perimeter shapes of the other mounting positions. Each connector of plural first connectors includes a threaded portion holding a first nut with an outer perimeter having a shape being unique, as compared to the first nuts of other first connectors. The outer perimeter of the first nut seats into one, and only one, of the plural mounting positions of the plate.

Optionally, a second plate may be mounted to, and spaced from, the first plate. The second plate includes plural keyholes which are aligned to the plural mounting positions. Each keyhole has an inner perimeter shape matching the inner perimeter shape of the mounting position to which the keyhole is aligned. The keyholes only permit a second connector, with a matching key nut, to pass therethrough and mate into the first connector in the aligned mounting position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein being interpreted accordingly.

Figure 1:
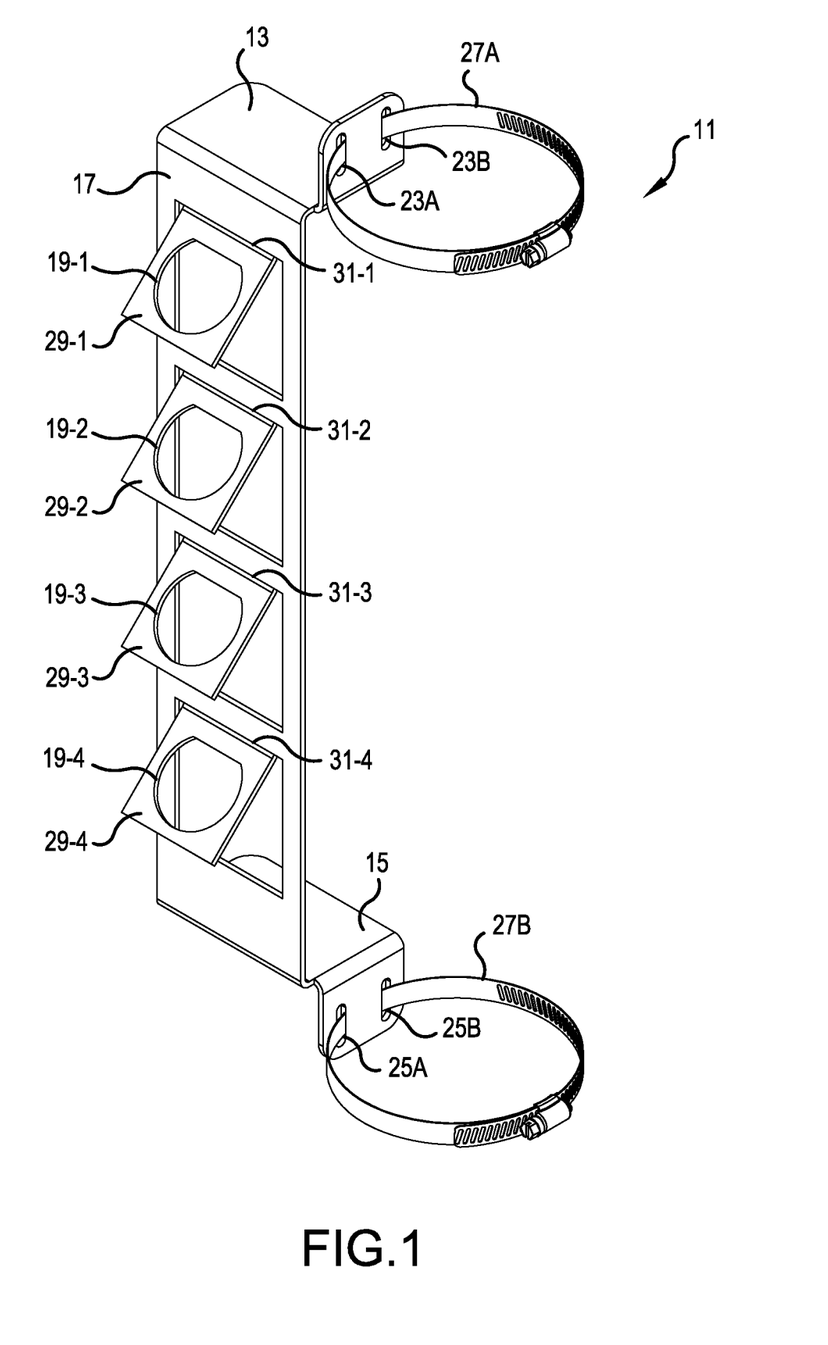
FIG. 1 is a front perspective view of a mounting system for holding connectors, in accordance with a first embodiment of the present invention.
Figure 2:
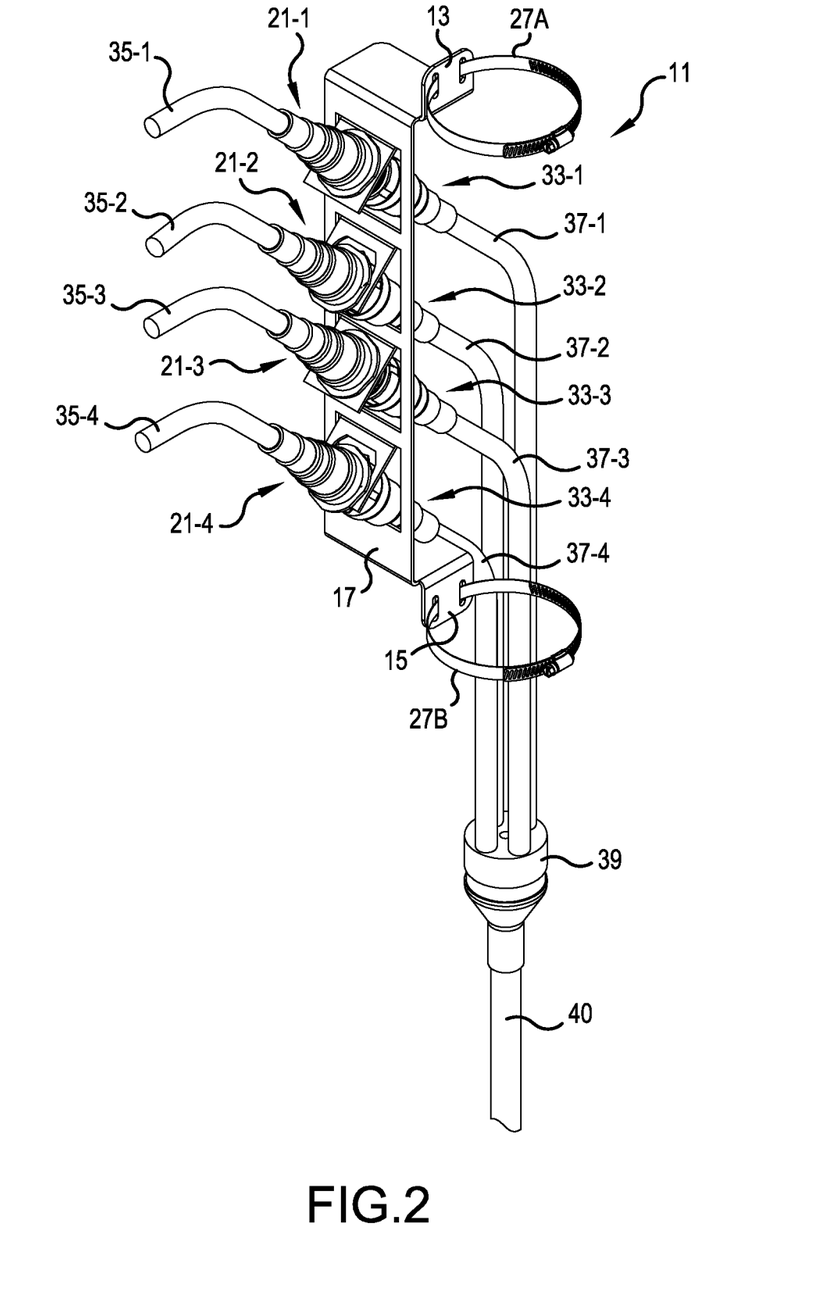
FIG. 2 is a front perspective view of the mounting system of FIG. 2 with connectors mounted thereto.

FIGS. 1 and 2 show a first embodiment of a mounting system 11 for facilitating ordered mating of plural connectors. The mounting system 11 includes a bracket first portion 13 having at least one feature for securing the bracket first portion 13 to a pole or wall and a bracket second portion 15 having at least one feature for securing the bracket second portion 15 to a pole or wall.

A plate 17 is located between the bracket first portion 13 and said bracket second portion 15, e.g., directly connected to, or formed integrally with, the bracket first portion 13 and the bracket second portion 15. The plate 17 has plural mounting positions 19-1, 19-2, 19-3 and 19-4 for securing plural first connectors 21-1, 21-2, 21-3 and 21-4 (See FIG. 2) thereto. Although four mounting positions 19 are shown in FIGS. 1 and 2, more or fewer mounting positions 19 may be included in the plate 17 to accommodate more or fewer first connectors 21.

In one embodiment, the at least one feature for securing the bracket first portion 13 to a pole or wall includes two through holes or channels 23A and 23B formed in the bracket first portion 13. Likewise, the at least one feature for securing the bracket second portion 15 to the pole or wall includes two through holes or channels 25A and 25B formed in the bracket second portion 15. In FIGS. 1 and 2, a first hose clamp 27A is passed through the through holes or channels 23A/B of the bracket first portion 13, and a second hose clamp 27B is passed through the through holes or channels 25A/B of the bracket second portion 15. However, would be possible to use other fixing structures, such as a plate and threaded rods, or a C-clamp with two treaded ends passing through said through holes or channels 23A/B and 25A/B, and nuts attached to said threaded ends (as will be further explained in conjunction with the embodiment depicted in FIGS. 5 and 6).

The plate 17 includes a plurality of tabs 29-1, 29-2, 29-3 and 29-4 cut therein. Each tab 29 is connected to remaining portions of the plate 17 by only one side 31 of the tab 29. The other remaining sides of the tab 29 are disconnected from the plate 17. Each tab 29 is bent at the one side 31 attached the plate 17, so as to extend at an angle relative to the remaining portions of the plate 17. The angle of extension is between ten to eighty degrees, such as approximately twenty five to fifty five degrees, and more preferably at an angle of approximately forty five degrees, as depicted in FIGS. 1-2. The angle of the tab 29 assists in routing water away from connectors in the mounting positions 19.

FIG. 2 is a perspective view of the mounting system 11 of FIG. 1 with first connectors 21 fixed in the mounting positions 19 and a plurality of second connectors 33-1, 33-2, 33-3 and 33-4 mated to the plurality of first connectors 21-1, 21-2, 21-3 and 21-4, respectively. In a typical arrangement, the plurality of first connectors 21-1, 21-2, 21-3 and 21-4 are attached to first cords 35-1, 35-2, 35-3 and 35-4, respectively, which each extend to equipment mounted proximate a top of a tower structure, such as remote radio units (RRUs). The plurality of second connectors 33-1, 33-2, 33-3 and 33-4 are attached to second cords 37-1, 37-2, 37-3 and 37-4, respectively, which extend to a transition 39. Within the transition 39, the optical fiber and/or electrical conductors within the second cords 33-1, 33-2, 33-3 and 33-4 are transitioned into a jacket of a larger trunk cable 40. The trunk cable 40 is routed to service provider equipment located proximate a bottom of the tower structure.

Figure 3:
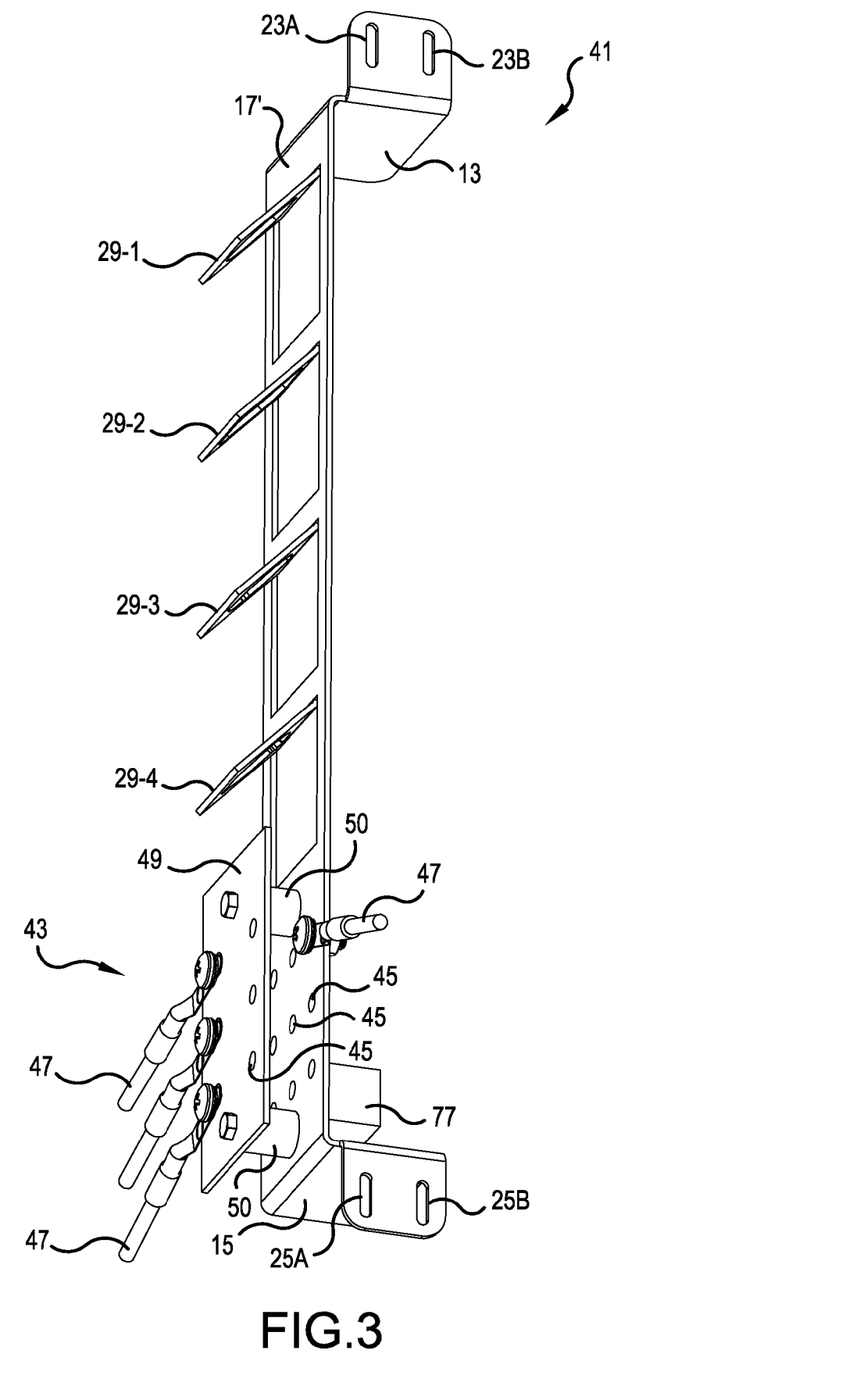
FIG. 3 is a front perspective view of a modified mounting system, similar to FIGS. 1-2, including a grounding region.

FIG. 3 is a perspective view of a modified mounting system 41 in accordance with the first embodiment. The modified mounting system 41 is the same as the mounting system of FIGS. 1 and 2, except for the inclusion of a grounding region 43 located on a modified plate 17'. The modified plate 17' differs from the plate 17 of FIGS. 1 and 2 by including additional surface area proximate the bracket second portion 15. The identically formed structures have been labeled with the same reference numerals and will not be described in detail again.

The grounding region 43 includes plural through holes 45 for accepting ground wires 47. If additional grounding locations are needed, the grounding region 43 may optionally include a bus bar 49 mounted thereto by standoffs 50, wherein the bus bar 49 also includes plural through holes 45 for accepting ground wires 47.

Figure 4:
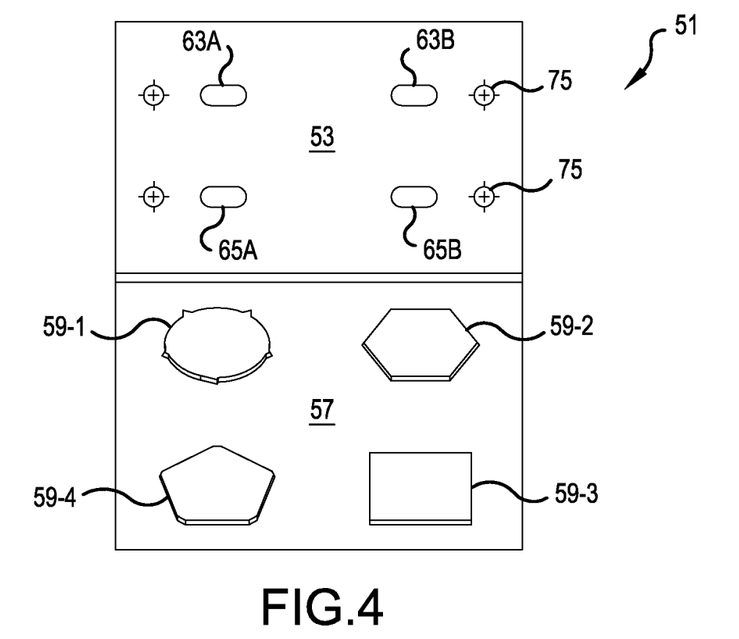
FIG. 4 is a front view of a mounting system for holding connectors, in accordance with a second embodiment of the present invention.
Figure 5:
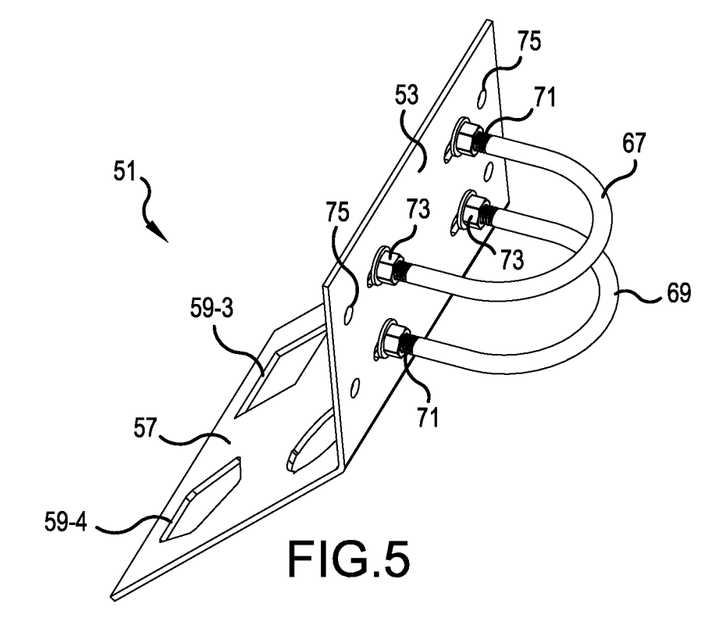
FIG. 5 is a rear perspective view of the mounting system of FIG. 4.

FIGS. 4 and 5 show a second embodiment of a mounting system 51 for facilitating ordered mating of plural connectors. The mounting system 51 includes a bracket first portion 53 having at least one feature for securing the bracket first portion 53 to a pole or wall.

A plate 57 is attached to the bracket first portion 53, e.g., directly connected to, or formed integrally with, the bracket first portion 53. The plate 57 has plural mounting positions 59-1, 59-2, 59-3 and 59-4 for securing plural first connectors 81-1, 81-2, 81-3 and 81-4. The first connectors 82 will be described in greater detail with reference to FIG. 7 hereinafter. Although four mounting positions 59 are shown in FIGS. 4 and 5, more or fewer mounting positions 59 may be included in the plate 57 to accommodate more or fewer first connectors 81.

In one embodiment, the at least one feature for securing the bracket first portion 53 to a pole or wall includes two through holes or channels 63A and 63B formed in an upper area of the bracket first portion 53 and at least two through holes or channels 65A and 65B formed in a lower area of the bracket first portion 53. In FIGS. 4 and 5, first and second C-clamps 67 and 69 have threaded ends 71. The threaded ends 71 are passed through the through holes or channels 63A/B and 65A/B, and nuts 73 are attached to the threaded ends 71. In one embodiment (illustrated in FIG. 5), two nuts 73 are threaded onto each threaded end 71, and the bracket first portion 53 is sandwiched between inner and outer nuts 73 on each threaded end 71.

As best seen in FIG. 5, the plate 57 extends at an angle to the bracket first portion 53, wherein the angle is not zero, ninety or one hundred eighty degrees. The angle may reside between ten to eighty degrees, such as approximately twenty five to fifty five degrees, and more preferably at an angle of approximately forty five degrees, as depicted in FIG. 5.

The bracket first portion 53 also optionally includes one or more grounding regions, characterized by through holes 75 for accepting ground wires, like ground wires 47 in FIG. 3. If additional grounding locations are needed, the grounding region(s) may optionally include a bus bar, like bus bar 49 of FIG. 3, mounted thereto by standoffs, to provide additional through holes 75 for accepting ground wires 47.

Figure 6:
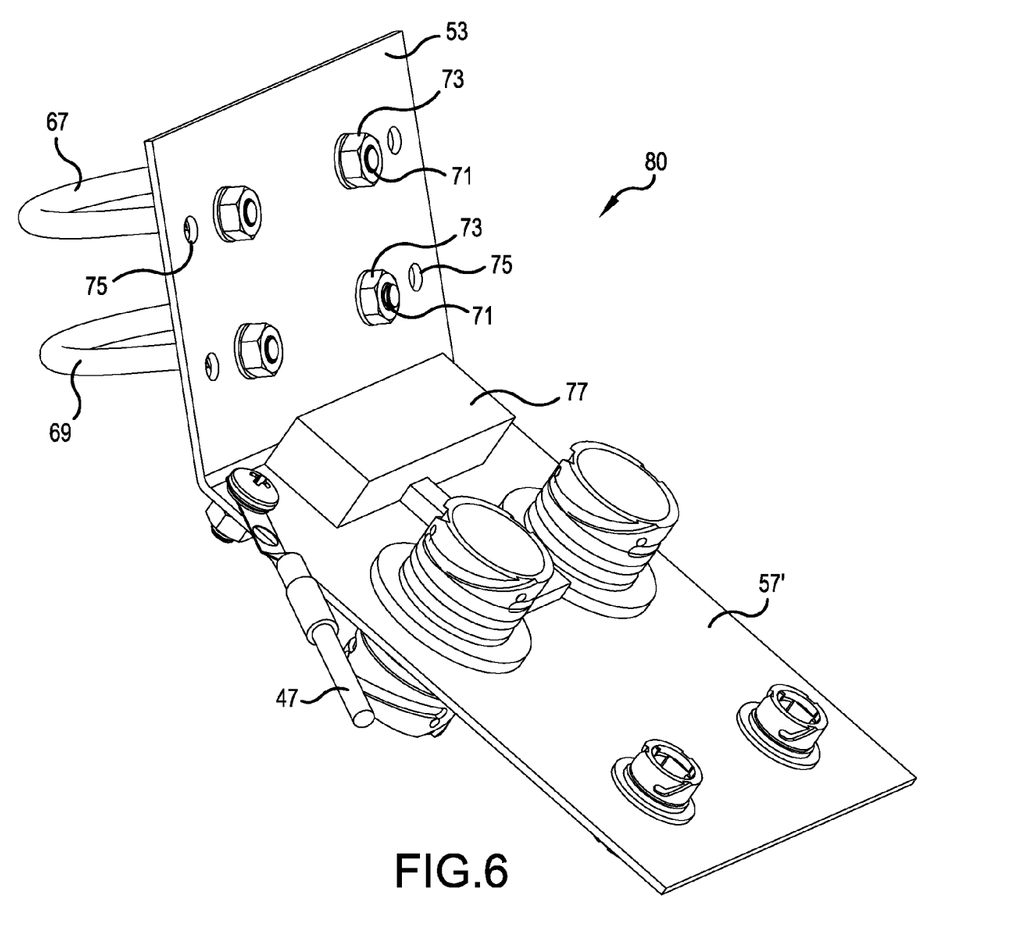
FIG. 6 is a rear perspective view of a modified mounting system, similar to FIGS. 4-5, including a surge arrestor, a grounding region, and connectors mounted thereto.

FIG. 6 is a perspective view of a modified mounting system 80 in accordance with the second embodiment. The modified mounting system 80 is the same as the mounting system 51 of FIGS. 4 and 5 except for three modifications.

First, FIG. 6 demonstrates the inclusion of an optional surge arrestor 77 attached to a backside of the plate 57'. The surge arrestor 77 communicates with one or more connectors located within the plural mounting positions 59-1, 59-2, 59-3 and 59-4 of the plate 57'. The embodiment of FIGS. 1-3, as well as the other embodiments herein, may also include a surge arrestor 77, and one or more grounding regions 43. See the surge arrestor 77 in FIG. 3, and the surge arrestor 77 and grounding region 43 in FIG. 11.

Second, FIG. 6 demonstrates that the plural mounting positions 59-1, 59-2, 59-3 and 59-4 may be sized differently to accept larger or smaller connectors. Examples of differently sized connectors include a small, dedicated, fiber optic connector, e.g. a single SC adapter for an alarm wire, a small, dedicated, electrical connector, e.g., a single pin socket for an alarm wire, a midsized, fiber optic connector, e.g., a duplex LC adapter for communication signaling, a midsized electrical connector, e.g., an RJ-type jack for communication signally, a larger hybrid connector, e.g., a connector having two LC duplex adapters for communications and three electrical pin sockets for power.

Third, FIG. 6 demonstrates that both the bracket first portion 53 and the plate 57' may include through holes 75 for accepting ground wires 47. Of course, the plate 57' may include through holes 75 on the opposite side of the surge arrestor 77, and a grounding bar 49 mounted on standoffs 50, if desired.

Returning now to FIGS. 4-5, a keying aspect of the present invention will be described. Each of the plural mounting positions 59-1, 59-2, 59-3 and 59-4 has an inner perimeter shape formed in the plate 57, which is different than the inner perimeter shapes of the other mounting positions 59 in the plate 57. The inner perimeter shapes act as keying features to allow only one of a plurality of first connectors 81 to be attached into a particular mounting position 59 in the plate 57.

Figure 7:
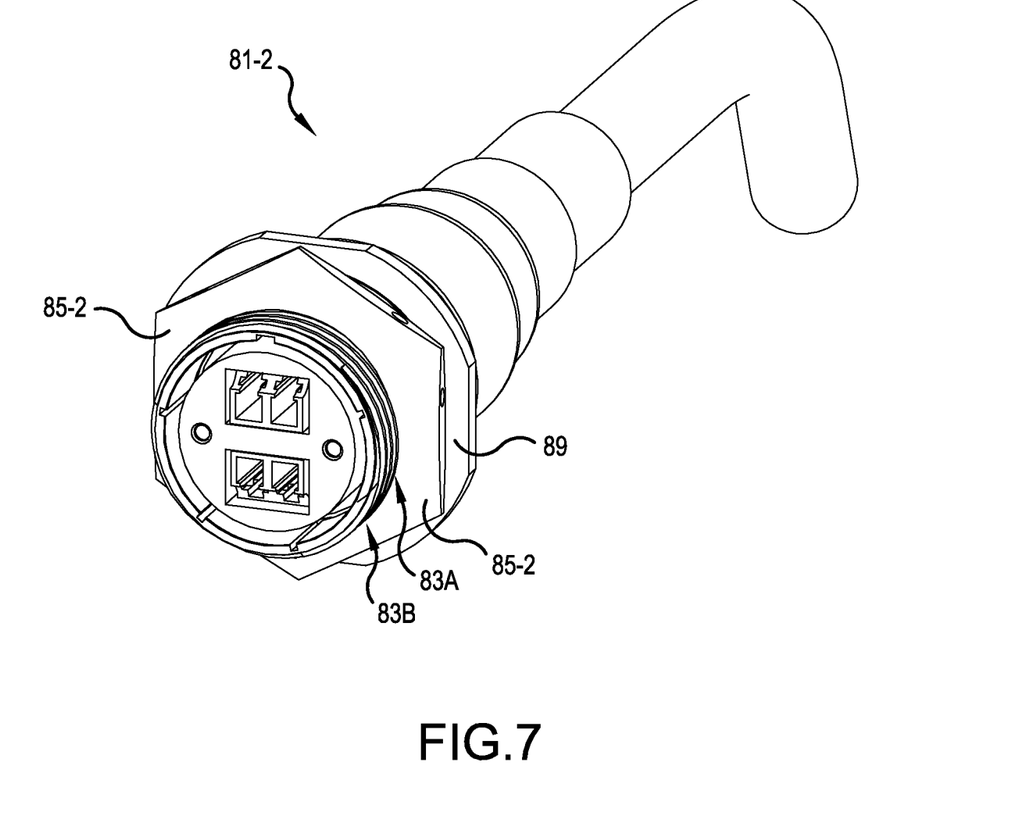
FIG. 7 is a front perspective view of a female hybrid connector with keying features, in accordance with the present invention.

FIG. 7 is a perspective view of a first connector 81-2 of the plurality of first connectors 81, in accordance with the present invention. The first connector 81-2 includes a first threaded portion 83A holding a first nut 85-2 with an outer perimeter having a shape being unique, as compared to the first nuts 85 of other first connectors 81. In the case of the first nut 85-2 shown in FIG. 7, the outer perimeter shape is hexagonal. Of course, many other shapes are possible, such as shapes including a pentagon (like mounting position 59-4), a square (like mounting position 59-3), a circle, a triangle, a circle with at least one flat edge portion, and a circle with evenly or unevenly spaced star tips (like the five star tips illustrated in mounting position 59-1).

The first connector 81-2 includes a stop flange 89. The first threaded portion 83A is adjacent to the stop flange 89, and the first nut 85-2 is threaded onto the first threaded portion 83A until it abuts the stop flange 89. Then, the first nut 85-2 may be adhered to the stop flange 89 and/or the first threaded portion 83A by an adhesive, e.g., an epoxy.

A second threaded portion 83B may be adjacent and optionally continuous to the first threaded portion 83A. The first connector 81-2 is mounted to the plate 57 by first locating or seating the first nut 85-2 within the corresponding mounting position 59-2 (having the matching hexagonal inner perimeter shape in the case of mounting position 59-2). Next, a portion of the plate 57 surrounding the matching inner perimeter shape of the mounting position 59-2 is sandwiched between the stop flange 89 and a second nut 82 threaded onto the second threaded portion 83B. See FIGS. 12-13 for an illustration of the second nut 82. An optional washer may be interposed between the second nut 82 and the plate 57, if desired.

The embodiment of FIGS. 4-6 shows a keying arrangement, wherein first connectors 81 are allowed to mount only at designated mounting positions 59 in the plate 57. In other words, the first nut 85 must have a matching shape to the inner perimeter of the mounting position 59 before the first connector 81 will seat into the mounting position 59. By this arrangement, the first connectors 81 may be organized on the plate 57 by a pre-ordered scheme, and the plate 57 may be permanently labeled, e.g., by impressions formed into the plate 57, to indicate the communication channels, power channels or alarm functions to be located at the various mounting positions 59. For example, the first mounting position 59-1 may indicate a first RRU servicing a north facing antenna, the second mounting position 59-2 may indicate a second RRU servicing an east facing antenna, etc. The mounting positions 29-1, 29-2, 29-3 and 29-4 in the first embodiment depicted in FIGS. 1-3 could also include the above-described keying arrangements.

In use, second connectors 33 from breakout cordage 37 of the trunk cable 40 are mated into the first connectors 81 in accordance with the function or service indicated by the placement of the first connectors 81 on the plate 57. Following the above example, if a second connector 33-2 is terminated on breakout cordage 37-2 from the truck cable 40, which communicates signals for the second RRU, a technician will mate that second connector 33-2 to the first connector 81-2 seated in the second mounting position 59-2 in the plate 57.

In the embodiment of FIGS. 4-6, keying is only taking place with regard to the first connectors 81. The skill of the technician is being relied upon to determine which second connector 33 should be mated to which first connector 81. Hence, misconnections may occur. In the third embodiment of the present invention, both the first connector 81 and a second connector 91 have keying aspects to address this potential misconnection issue.

Figures 8, 9:
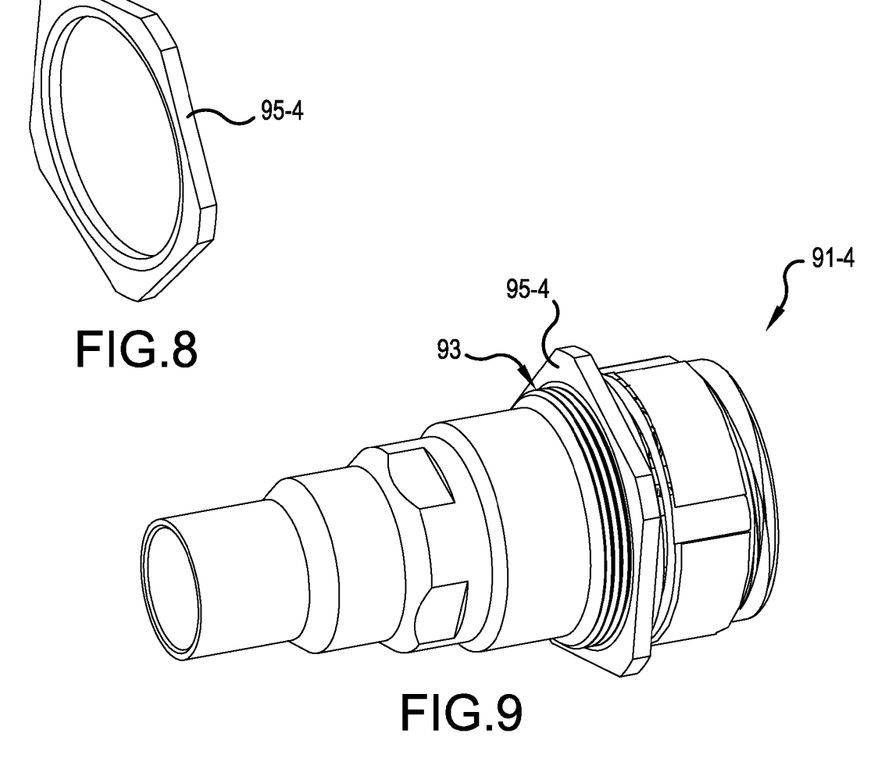
FIG. 8 is a front perspective view of a keying nut for use with the connectors with keying features of the present invention.
FIG. 9 is a rear perspective view of a male hybrid connector with keying features, in accordance with the present invention.
Figure 10:
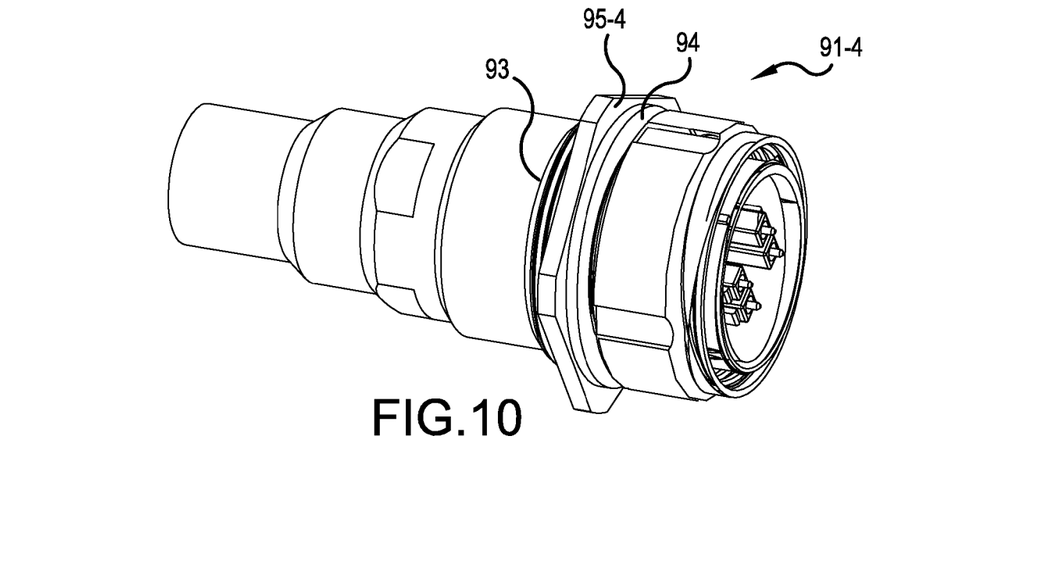
FIG. 10 is a front perspective view of the male hybrid connector of FIG. 9.

FIGS. 9 and 10 show a rear and front perspective view, respectively, of a second connector 91-4 of a plurality of second connectors 91, in accordance with the present invention. Each second connector 91 includes a third threaded portion 93 which extends up to a stop flange 94. The third threaded portion 93 holds a third nut 95. The third nut 95 may be adhered to the third threaded portions 93 and/or the stop flange 94 by an epoxy.

The third nut 95 has an outer perimeter having a shape which is unique, as compared to the third nuts 95 of other second connectors 91. In the case of third nut 95-4 in FIGS. 8-10, the outer perimeter shape forms a pentagon, as best seen in FIG. 8. Of course, many other shapes are possible, such as shapes including a hexagon (like mounting position 59-2), a square (like mounting position 59-3), a circle, a triangle, a circle with at least one flat edge portion, and a circle with evenly or unevenly spaced star tips (like the five star tips illustrated in mounting position 59-1).

Each second connector 91 is structured to mate with a first connector 81 of said plurality of first connectors 81. In the case of the hybrid connectors shown in FIGS. 7 and 9-10, the connector faces include two LC duplex connectors/adapters and two conductive pins/sockets.

Figure 11:
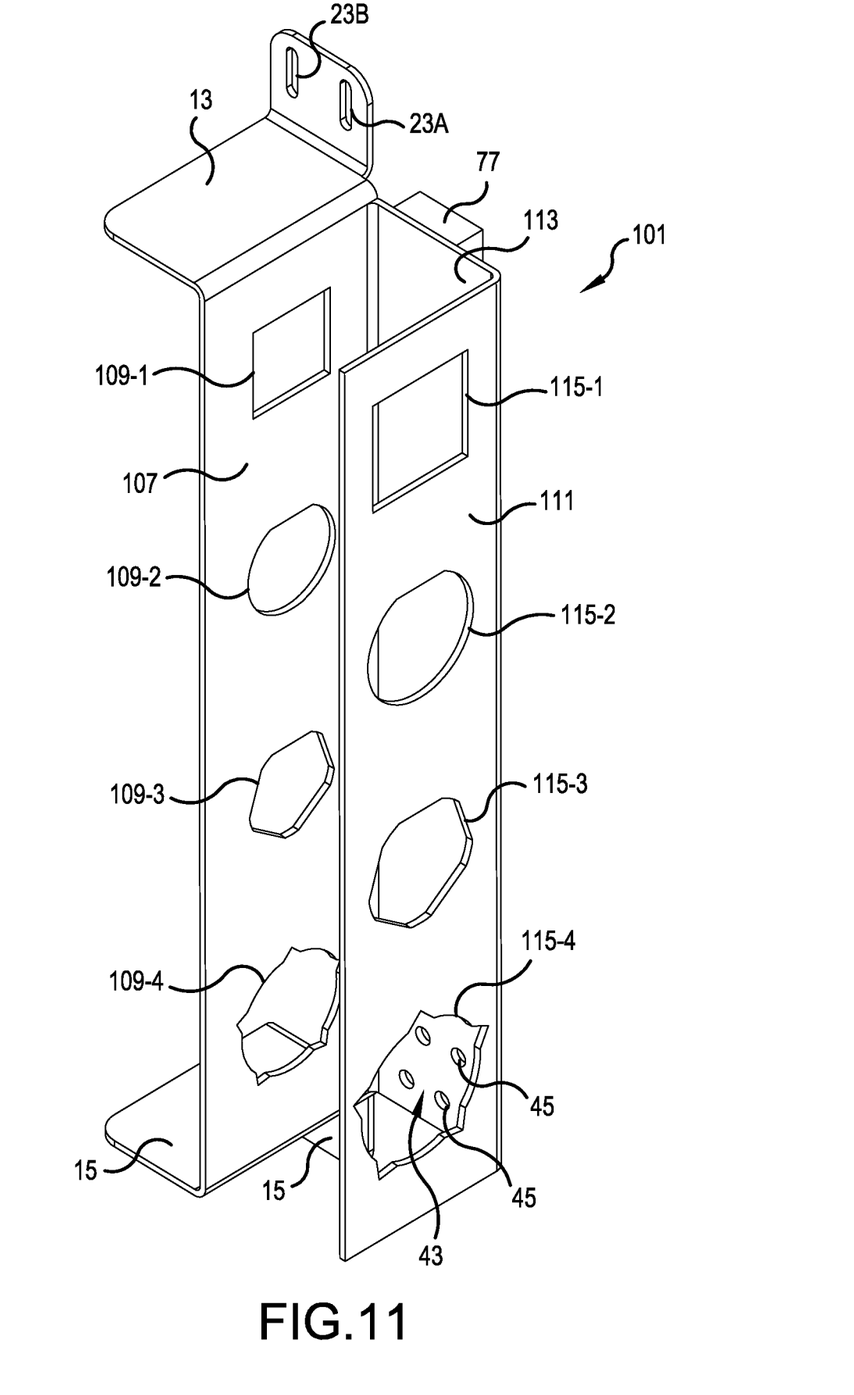
FIG. 11 is a front perspective view of a mounting system for holding connectors, in accordance with a third embodiment of the present invention.
Figure 12:
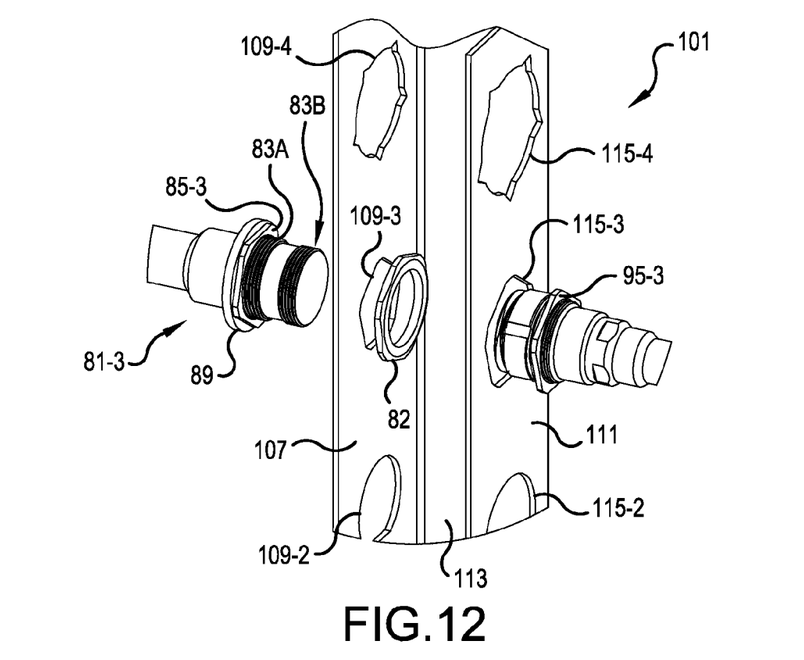
FIG. 12 is a close-up, front perspective view showing female and male connectors just prior to engagement with the mounting system of FIG. 11.
Figure 13:
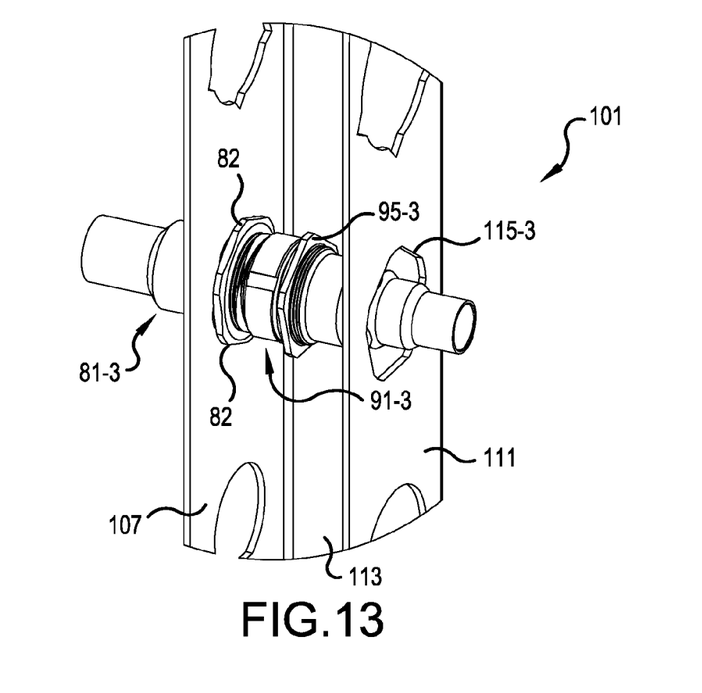
FIG. 13 is a close-up, front perspective view showing the female connector of FIG. 12 connected to the mounting system, and the male connector mated to the female connector.

FIGS. 11-13 show a third embodiment of a mounting system 101 for facilitating ordered mating of plural connectors. The mounting system 101 includes a bracket first portion 13 having at least one feature 23A and 23B for securing the bracket first portion 13 to a pole or wall, and a bracket second portion 15 having at least one feature 25A and 25B for securing the bracket second portion 15 to a pole or wall.

A first plate 107 is located between the bracket first portion 13 and the bracket second portion 15, e.g., directly connected to, or formed integrally with, the bracket first portion 13 and the bracket second portion 15. The first plate 107 has plural mounting positions 109-1, 109-2, 109-3 and 109-4 for securing plural first connectors 81-1, 81-2, 81-3 and 81-4. The first connectors 81 are the same as described above in connection with FIG. 7. Although four mounting positions 109 are shown in FIG. 11, more or fewer mounting positions 109 may be included in the first plate 107 to accommodate more or fewer first connectors 81.

A second plate 111 is attached to and spaced from the first plate 107. The one embodiment, the second plate 111 is integrally formed with the first plate 107 and a bent section 113 formed at ninety degrees relative to the first plate 107, and at ninety degrees relative to the second plate 111, creates the spacing. The second plate 111 has plural keyholes 115-1, 115-2, 115-3 and 115-4, which are aligned to the plural mounting positions 109-1, 109-2, 109-3 and 109-4, formed in the first plate 107. Each of the plurality of keyholes 115 has an inner perimeter shape formed in the second plate 111, which is different than the inner perimeter shapes of the other keyholes 115 formed in the second plate 111.

In a preferred embodiment, the inner perimeter shape of each keyhole 115 matches the inner perimeter shape of the mounting position 109 in the first plate 107 to which the keyhole 115 is aligned, but is slightly larger in size than the inner perimeter shape of the aligned mounting position 109. The third nut 95 is slightly larger than the first nut 85, so that the third nut 95 extends outwardly of the stop flange 94, as best seen in FIG. 10. Hence, by making the keyhole 115 slightly larger (as compared to the mounting hole 109), the third nut 95 passes through the keyhole 115 and the stop flange 94 does not contact any portion of the second plate 111, such that the entire second connector 91 passes through the keyhole 115, as best seen in FIG. 13. Once, the second connector 91 passes through the keyhole 115, it may be mated to the first connector 81 in the aligned mounting position 109.

In the third embodiment of FIGS. 11-13, keying is taking place with regard to the first connectors 81 and the second connectors 91. The skill of the technician is not being relied upon to determine which second connector 91 should be mated to which first connector 81. Hence, the likelihood of misconnections is greatly reduced.

Only second connectors 91 with a third nut 95 with a shape matching a first nut 85 will be able to pass through the keyhole 115 to mate with a first connector 81 in the aligned mounting position 109. A second connector 91 with a third nut 95 not matching the shape of the first nut 85 on the first connector 81 in the aligned mounting position 109, will be blocked by the perimeter of the keyhole 115, so that a misconnection cannot occur. By this arrangement, the outer perimeter shape of the third nut 95 only permits the second connector 91 to be able to pass through one and only one of the plural keyholes 115.

Figure 14:
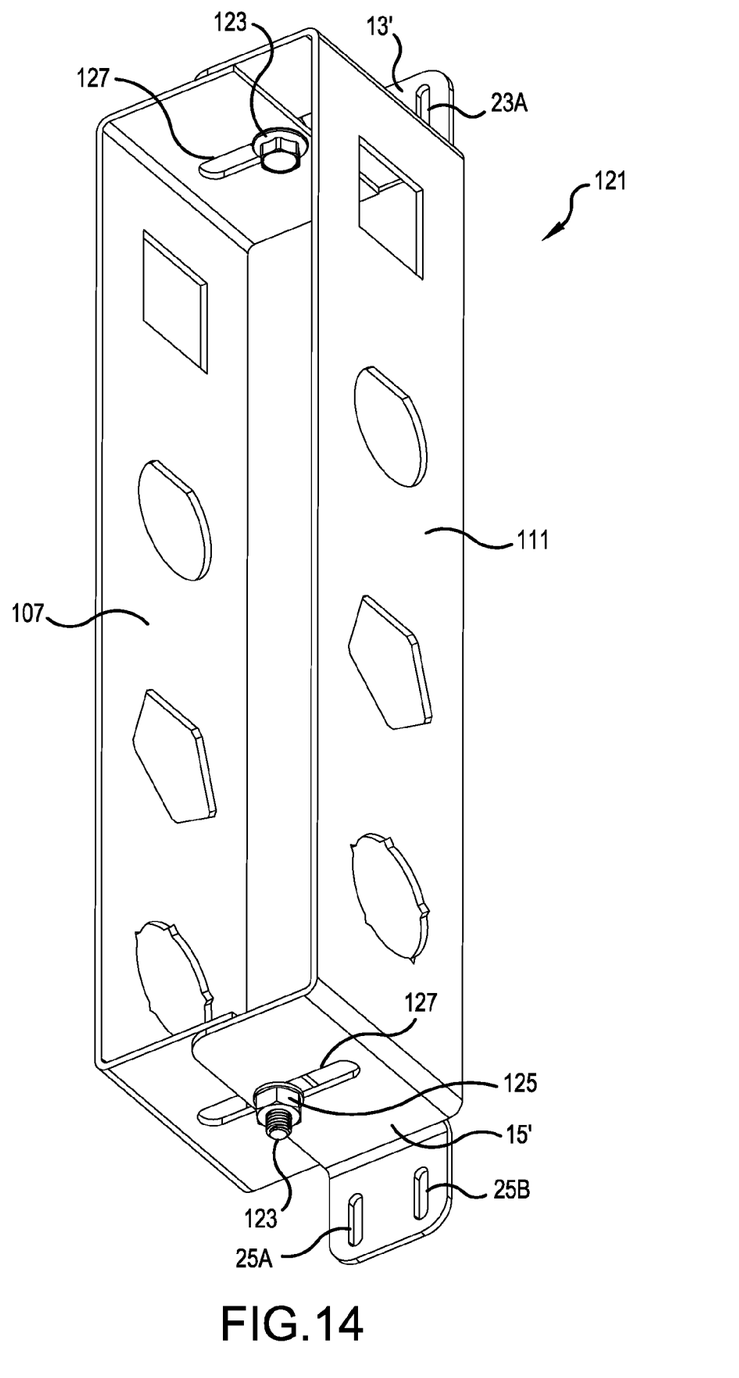
FIG. 14 is a front perspective view of a modified mounting system, similar to FIGS. 11-13, including an adjustable spacing feature.

FIG. 14 is a perspective view of modified mounting system 121 in accordance with the third embodiment. The modified mounting system 121 is the same as the mounting system of FIGS. 11-13 except that the second plate 111 is mounted to the pole or wall using the bracket first and second portions 13 and 15. Further, the second plate 111 is attached to the first plate 107 by threaded fasteners 123 and nuts 125, such that the spacing between the second plate 111 and the first plate 107 may be adjusted by sliding the threaded fasteners 123 within slot 127 and then tightening the nuts 125.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A mounting system comprising:
    a first plate comprising a plurality of mounting positions, wherein each mounting position within said plurality of mounting positions comprises a tab attached on one side to said first plate and disconnected on other sides from said first plate, wherein each tab is angled out from a plane of a face of said first plate, and wherein each mounting position comprises an inner perimeter shape formed in said tab of said mounting position, wherein each inner perimeter shape is different from each other inner perimeter shape of said tabs of said plurality of mounting positions;

a second plate attached to and spaced apart from said first plate, said second plate having a plurality of keyholes which are aligned to said plurality of mounting positions formed in said first plate, wherein each keyhole of said plurality of keyholes comprises an inner perimeter shape formed in said second plate and different from inner parameter shapes of other keyholes of the plurality of keyholes; and a bracket connected to said first plate and said second plate and comprising a feature configured to secure said bracket to an object.

2. The mounting system according to claim 1, wherein said bracket includes a bracket first portion and a bracket second portion, and wherein said first plate is located between said bracket first portion and said bracket second portion, wherein both of said bracket first portion and said bracket second portion include said feature for securing said bracket to said object.

3. The mounting system according to claim 1, wherein said feature comprises two through holes formed in said bracket, said mounting system further comprising:
 a clamp with a first threaded end and a second threaded end, each threaded end passing through a respective one of said two through holes, and
 a first pair of nuts and second pair of nuts respectively attached to said first threaded end and said second threaded end.

4. The mounting system according to claim 1, wherein said first plate extends at an angle to said bracket, and wherein said angle is not zero, ninety or one hundred eighty degrees.

5. The mounting system according to claim 1, wherein an angle of each tab is between 10 to 80 degrees.

6. The mounting system according to claim 1, further comprising:
 a plurality of first connectors, each first connector comprising a first threaded portion holding a first nut having an outer perimeter shape wherein each outer perimeter shape is different from each other outer perimeter shape of said first nuts of said plurality of first connectors, and wherein each outer perimeter shape seats into a corresponding inner perimeter shape of said tabs of said plurality of mounting positions, and
 wherein each first connector includes a second threaded portion holding a second nut, wherein said second nut secures said first connector into a corresponding mounting position.

7. The mounting system according to claim 6, wherein a selected outer perimeter shape comprises a pentagon, square, circular, triangular, circular with at least one flat edge portion, circular with at least one star tip protrusion, or hexagonal shape.

8. The mounting system according to claim 1, wherein an inner perimeter shape of a first keyhole in the plurality of keyholes matches the inner perimeter shape of a first mounting position in said first plate to which said first keyhole is aligned.

9. The mounting system according to claim 8, wherein the inner perimeter shape of the first keyhole is larger in size than the inner perimeter shape of the first mounting position in said first plate to which said first keyhole is aligned.

10. The mounting system according to claim 8, further comprising:
 a plurality of second connectors, each second connector including a third threaded portion holding a third nut with an outer perimeter having a shape unique as compared to third nuts of other second connectors of said plurality of second connectors, each outer perimeter of each third nut being able to pass through at most one keyhole of said plurality of keyholes of said second plate, and
 each second connector being structured to mate with a respective first connector attached to the mounting position in said first plate which is aligned with the keyhole through which said second connector passes.

11. The mounting system according to claim 1, wherein said second plate is attached to said first plate by fasteners such that a spacing between said second plate and said first plate may be adjusted.

12. The mounting system according to claim 1, further comprising:
 a grounding region associated with at least one of said first plate and said bracket, said grounding region including plural through holes for accepting ground wires.

13. The mounting system according to claim 12, wherein said grounding region includes a bus bar mounted thereto via offsets, said bus bar including said plural through holes for accepting ground wires.

14. The mounting system of claim 1, wherein a first connector is mounted at a first mounting position and a second connector is mounted at a second mounting position, wherein the first connector is mated to a first cord carrying an optical fiber, and wherein the second connector is mated to a second cord carrying an electrical conductor.

15. A plurality of connectors comprising:
 a plurality of first connectors, each first connector including a first threaded portion and a first nut threaded onto said first threaded portion, wherein said first nut of each first connector comprises an outer perimeter having a shape different from shapes of other first nuts of other first connectors of said plurality of first connectors; and
 a plurality of second connectors, each second connector including a third threaded portion and a third nut threaded onto said third threaded portion, wherein said third nut comprises an outer perimeter having a shape unique as compared to third nuts of other second connectors of said plurality of second connectors,
 wherein each second connector being structured to mate with a first connector of said plurality of first connectors, and
 wherein each first connector includes a second threaded portion and a second nut threaded onto said second threaded portion, wherein said second nut is used to secure said first connector into a mounting position in a plate.

16. The plurality of connectors according to claim 15, wherein each first connector further includes a stop flange, wherein said first threaded portion is adjacent to said stop flange and said first nut abuts said stop flange, and wherein said second threaded portion is adjacent to said first threaded portion, and wherein said first connector is mounted to the plate by locating the first nut within the mounting position and sandwiching a portion of the plate forming a perimeter of the mounting position between said stop flange and said second nut or a washer adjacent to said second nut.

17. A mounting system comprising:
- a bracket having at least one feature for securing said bracket to a pole or wall;
- a plate connected to said bracket, said plate having a plurality of mounting positions, each having an inner perimeter shape different from the inner perimeter shapes of the other mounting positions;
- a plurality of connectors, each connector including a first threaded portion holding a first nut with an outer perimeter having a shape unique as compared to first nuts of other first connectors of said plurality of connectors, said outer perimeter of said first nut seating into one and only one of said plural mounting positions of said plate; and
- each connector including a second threaded portion holding a second nut, wherein said second nut is used to secure said connector into a mounting position in said plate.

18. The mounting system of claim 17, wherein the plurality of connectors comprises a first connector mated to a first cord carrying an optical fiber, and a second connector mated to a second cord carrying an electrical conductor.

* * * * *